US009450796B2

United States Patent
Lee et al.

(10) Patent No.: US 9,450,796 B2
(45) Date of Patent: Sep. 20, 2016

(54) RANDOM ACCESS PREAMBLE STRUCTURE IN EXTENDED CELLS ENVIRONMENT

(75) Inventors: Moon-Sik Lee, Daejeon (KR); Hye-Kyung Jwa, Daejeon (KR); Hyoseok Yi, Daejeon (KR); Young-Hoon Kim, Daejeon (KR); Seung-Chan Bang, Daejeon (KR)

(73) Assignees: Electronics and Telecommunications Research Institute (KR); Samsung Electronics Co., Ltd. (KR)

( * ) Notice: Subject to any disclaimer, the term of this patent is extended or adjusted under 35 U.S.C. 154(b) by 780 days.

(21) Appl. No.: 12/523,125

(22) PCT Filed: Jan. 4, 2008

(86) PCT No.: PCT/KR2008/000057
§ 371 (c)(1),
(2), (4) Date: Dec. 7, 2009

(87) PCT Pub. No.: WO2008/082273
PCT Pub. Date: Jul. 10, 2008

(65) Prior Publication Data
US 2010/0080307 A1    Apr. 1, 2010

(30) Foreign Application Priority Data

Jan. 4, 2007   (KR) .................. 10-2007-0001139
Feb. 9, 2007   (KR) .................. 10-2007-0013813
Jan. 4, 2008   (KR) .................. 10-2008-0001424

(51) Int. Cl.
  *H04L 27/00*   (2006.01)
  *H04L 27/26*   (2006.01)
(52) U.S. Cl.
  CPC .................... *H04L 27/2607* (2013.01)
(58) Field of Classification Search
  CPC ............ H04W 74/0833; H04L 27/2613; H04L 27/2647; H04L 1/0003; H04L 1/0071
  USPC ....... 375/136, 259, 295, 343, 145, 267, 316, 375/140; 370/206, 329, 342, 203, 208, 350, 370/328, 331
  See application file for complete search history.

(56) References Cited

U.S. PATENT DOCUMENTS 7,317,747 B2 *  1/2008  Miyazaki et al. ............ 375/136
7,414,963 B2 *  8/2008  Kumar et al. ................ 370/206
(Continued)

FOREIGN PATENT DOCUMENTS

| EP | 1276288 A1 * | 1/2003 | ............ H04L 27/26 |
|----|---|---|---|
| KR | 1020050090086 | 9/2005 | |
| KR | 1020070065101 | 6/2007 | |
| WO | WO 2005/022792 A2 | 3/2005 | |
| WO | WO 2005/064867 A1 | 7/2005 | |

OTHER PUBLICATIONS

Written Opinion of the International Search Authority, Form PCT/ISA/237 (4pp).

(Continued)

*Primary Examiner* — Daniel Washburn
*Assistant Examiner* — Fitwi Hailegiorgis
(74) *Attorney, Agent, or Firm* — The Farrell Law Firm, P.C.

(57) ABSTRACT

Provided is a method of forming a random access preamble structure for an extended cell radius in a cellular system, the method including: generating a cyclic prefix (CP), which is the sum of a maximum delay spread and the maximum round trip delay according to the extended cell; generating a preamble sequence part. The method is used to form a preamble structure for an extended cell radius from among random access preamble structures transmitted when initial synchronization is achieved, when synchronization is lost, or when a handover is performed, during a random access process of the cellular system.

10 Claims, 7 Drawing Sheets

(56) References Cited

U.S. PATENT DOCUMENTS

| | | | |
|---|---|---|---|
| 7,418,065 B2* | 8/2008 | Qiu et al. | 375/343 |
| 7,599,327 B2* | 10/2009 | Zhuang | 370/329 |
| 7,630,690 B2 | 12/2009 | Kaewell, Jr. et al. | |
| 2004/0047284 A1* | 3/2004 | Eidson | 370/203 |
| 2005/0090202 A1 | 4/2005 | Kim et al. | |
| 2005/0111522 A1* | 5/2005 | Sung et al. | 375/145 |
| 2006/0078040 A1* | 4/2006 | Sung et al. | 375/140 |
| 2006/0126491 A1* | 6/2006 | Ro et al. | 370/208 |
| 2007/0171889 A1* | 7/2007 | Kwon et al. | 370/350 |
| 2007/0291696 A1* | 12/2007 | Zhang et al. | 370/331 |
| 2008/0080461 A1* | 4/2008 | Lee | 370/342 |
| 2008/0101493 A1* | 5/2008 | Niu et al. | 375/267 |
| 2008/0101495 A1* | 5/2008 | Gaikwad | 375/267 |
| 2008/0192678 A1* | 8/2008 | Bertrand et al. | 370/328 |

OTHER PUBLICATIONS

International Search Report, Form PCT/ISA/210 (3pp).

Choong Il Yeh et al., "An Efficient TDMA Based MAC Frame Structure in OFDM Systems", The 14th IEEE International Symposium on Personal, Indoor and Mobile Radio Communication Proceedings, Sep. 7, 2003.

Jae Joon Park et al., "Uplink Packet Synchronization of OFDMA Systems", IEEE 64th Vehicular Technology Conference, Sep. 1, 2006.

Korean Office Action dated Jul. 2, 2015 issued in counterpart application No. 10-2008-0001424, 3 pages.

* cited by examiner

RANDOM ACCESS PREAMBLE STRUCTURE IN EXTENDED CELLS ENVIRONMENT

TECHNICAL FIELD

The present invention relates to a random access preamble structure for an extended cell radius.

The present invention is derived from research performed as a part of IT next generation engine core technology development work by the Ministry of Information and Communication and the Institute for Information Technology Advancement. [Research No.: 2005-S-404-12, Research Title: 3G Evolution Wireless Transmission Technology Development]

BACKGROUND ART

According to a conventional random access preamble structure for an extended cell radius the length of a preamble sequence part and cyclic prefix (CP) are maintained equal to the preamble sequence part and CP of a standard preamble structure for a normal cell radius, and only a guard time (GT) is extended so as to be suitable for the maximum round trip delay.

Since the conventional random access preamble structure cannot consider the maximum round trip delay according to the extended cell radius in regard to a CP length, when the round trip delay of a preamble is longer than the CP length, it is not easy to detect a preamble signal from a frequency domain.

FIG. 1 is a diagram illustrating a 1 ms standard random access preamble structure for a normal cell radius. The 1 ms standard ransom access preamble structure is formed of a CP 101, preamble sequence part 102, and a GT 103 that is the maximum round trip delay.

FIG. 2 is a diagram illustrating a conventional random access preamble structure for an extended cell radius. As shown in FIG. 2, a CP 201 and a preamble sequence part 202 are maintained equal to the CP 101 and the preamble duration 102 of the standard preamble structure of FIG. 1, and only a GT 203 is extended so as to be suitable for the maximum round trip delay according to the extended cell radius.

DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Technical Problem

Figure 2:
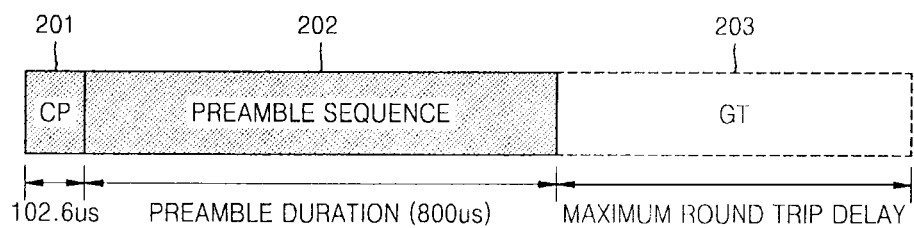
FIG. 2 is a diagram illustrating a conventional random access preamble structure for an extended cell radius.

In the conventional random access preamble structure, since the CP 201 is equal to the CP 101 of the standard preamble structure, a problem occurs in a reception terminal while realizing a frequency domain. In other words, according to FIG. 2, since the length of the CP 201 is equal to the length of the CP 101 used in the normal cell radius, when the round trip delay is longer than that in the normal cell radius, a part of a received signal may not be included in a detected domain. In this case, detection performance may deteriorate.

Accordingly, a random access preamble structure for an extended cell radius, wherein detection performance is improved in a frequency domain is suggested.

Technical Solution

The present invention provides a random access preamble structure for an extended cell radius, wherein a problem that occurs in a reception terminal while realizing a frequency domain can be solved by maintaining the length of a preamble sequence part equal to that of a preamble sequence part used in a 1 ms standard random access preamble structure and extending a cyclic prefix (CP) and a guard time (GT) according to the maximum round trip delay. Also, a repetitive preamble structure is suggested in order to solve a problem of the 1 ms standard preamble structure, which occurs in a fast speed user environment cell, and thus the present invention also provides a preamble structure for an extended cell radius that can be used when such a repetitive preamble structure is used.

According to an aspect of the present invention, there is provided a method of forming a random access preamble structure for an extended cell radius in a cellular system, the method including: (a) assigning a guard time (GT), which is a maximum round trip delay according to an extended cell radius; (b) assigning a cyclic prefix (CP), which is the sum of a maximum delay spread and the maximum round trip delay according to the extended cell; (c) assigning a preamble duration in the same length as a preamble duration used in a standard random access preamble structure; and (d) forming a random access preamble structure for an extended cell radius by adding the CP, the GT, and the preamble duration.

When preamble energy is insufficient when a preamble duration, i.e. 800 us, is used in the standard random access preamble structure for a normal cell radius, (c) may assign the preamble duration used in the standard random access preamble structure to an n-times repetition preamble duration, i.e. n×800 us, until the preamble energy is sufficient.

According to another aspect of the present invention, there is provided a method of forming a repetitive random access preamble structure for an extended cell radius, the method including: assigning a GT, which is a maximum round trip delay according to an extended cell radius; assigning a CP, which is a sum of a maximum delay spread and the maximum round trip delay according to the extended cell radius; assigning a preamble duration in the same length as a preamble duration used in a repetitive standard random access preamble structure, wherein the preamble duration is formed of a preamble sequence and a repeated preamble sequence; and forming a random access preamble structure for an extended cell radius by adding the CP, the GT, and the preamble duration.

According to another aspect of the present invention, there is provided a computer readable recording medium including a random access preamble structure formed by using the method above. Such a random access preamble structure may be used in a cellular system, and more particularly, in a cellular phone.

According to another aspect of the present invention, there is provided a computer readable recording medium having recorded thereon a program for executing the method of above.

According to another aspect of the present invention, there is provided an apparatus for forming a random access preamble structure for an extended cell radius, the apparatus including: a GT assigner, which assigns a GT, which is a maximum round trip delay; a CP assigner, which assigns a CP, which is the sum of a maximum delay spread and the maximum round trip delay; a preamble duration assigner, which assigns a preamble duration in the same length as a preamble duration used in a standard random access preamble structure; and a preamble structure former, which forms a random access preamble structure for an extended cell radius by adding the CP, the GT, and the preamble duration, respectively obtained from the CP assigner, the GT assigner, and the preamble duration assigner.

Advantageous Effects

According to the present invention, a preamble sequence part is maintained equal to a preamble structure used in a standard preamble structure for a normal cell radius, and cyclic prefix (CP) is extended so as to be suitable for the maximum round trip delay according to an extended cell radius, and thus a receiver can easily realize a frequency domain.

Also according to the present invention, when preamble energy is insufficient with preamble duration used in a standard random access preamble structure, a length of a preamble sequence part is assigned in such a way that the length is an integral multiplication of a length of a preamble sequence part in the standard random access preamble structure until the preamble energy is sufficient. Accordingly, the receiver can easily realize a frequency domain.

BEST MODE

Hereinafter, the present invention will be described more fully with reference to the accompanying drawings, in which exemplary embodiments of the invention are shown.

While describing the present invention, detailed descriptions about related well-known functions or configurations that may diminish the clarity of the points of the present invention are omitted. Also, terms used while describing the present invention are defined considering their functions, and may be differently used according to intentions of a client, an operator, or a user, or according to customs. Accordingly, the terms should be defined based on the contents of the present specification.

Figure 3:
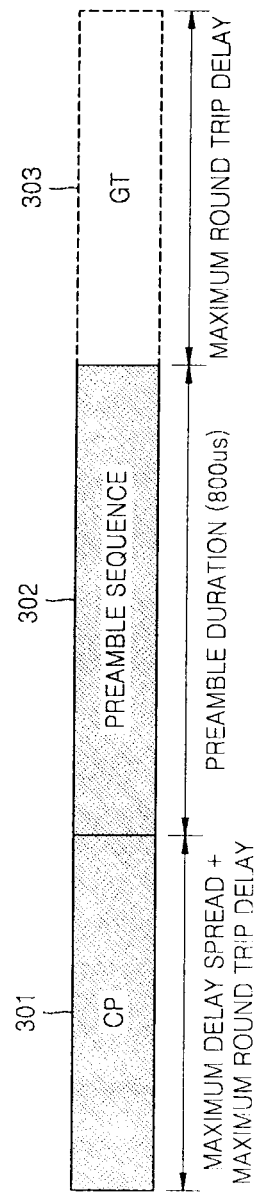
FIG. 3 is a diagram illustrating a random access preamble structure for an extended cell radius according to an embodiment of the present invention.

FIG. 3 is a diagram illustrating a random access preamble structure for an extended cell radius according to an embodiment of the present invention. The random access preamble structure in FIG. 3 is formed of a cyclic prefix (CP) 301, which is the sum of the maximum delay spread that is fixed irrelevantly to a cell radius and the maximum round trip delay that extends according to the extended cell radius, a preamble sequence part 302, which is equal to a preamble sequence part used in a standard preamble structure for a normal cell radius, and a guard time (GT) 303, which is the maximum round trip delay that extends according to the extended cell radius.

According to the random access preamble structure, a signal reception capacity can be improved as the CP 301 increases according to the extended cell radius.

A method of extending CP in an extended cell environment will now be described in detail.

Figure 1:
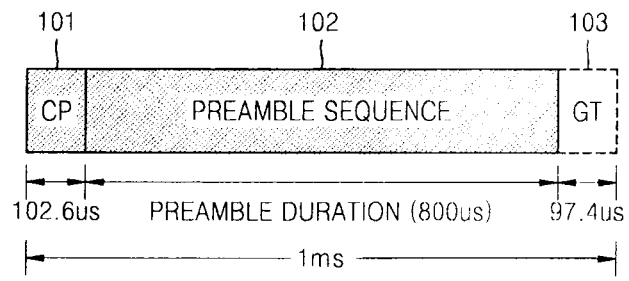
FIG. 1 is a diagram illustrating a standard random access preamble structure for a normal cell radius.

Since round trip delay in 1 km is approximately 6.67 us, the maximum round trip delay in 14.61 km is 14.61 km*6.67 us/km=97.4 us. As a result, a length of CP in a normal cell is 5.2 us (delay spread)+97.4 us (maximum round trip delay)=102.6 us, and this length of CP is equal to the length of CP illustrated in FIG. 1.

For example, when sampling time Ts is 32.55 ns (Jan. 30, 1972 MHz), the number of samples for the length $T_{CP}$ of CP is $T_{CP}/Ts$=102.6 us/32.55 ns=3152, and as a result, an equation $T_{CP}$=3152×Ts is satisfied. In the same sampling time Ts, the number of samples for a preamble sequence part (normally 800 us) in a normal cell environment is $T_{PRE}/Ts$=800 us/32.55 ns=24576. As a result, an equation $T_{PRE}$=24576×Ts is satisfied.

When a cell is extended and thus the radius becomes approximately 30 km (29.6 km to be exact), the maximum round trip delay becomes 29.6 km*6.67 us/km=197.4 us, and the length of CP in such extended cell is extended to 5.2 us (delay spread)+197.4 us (maximum round trip delay)=202.6 us. Such structure is reflected in FIG. 3.

In this case, the number of samples becomes $T_{CP}/Ts$=202.6 us/32.55 ns=6224. As a result, an equation of $T_{CP}$=6224×Ts is satisfied.

Similarly, when a cell radius is 101.7 km, the maximum round trip delay is 101.7 km*6.67 us/km=678.8 us, and the length of CP in the extended cell is 5.2 us (delay spread)+678.8 us (maximum round trip delay)=684 us.

Figure 4:
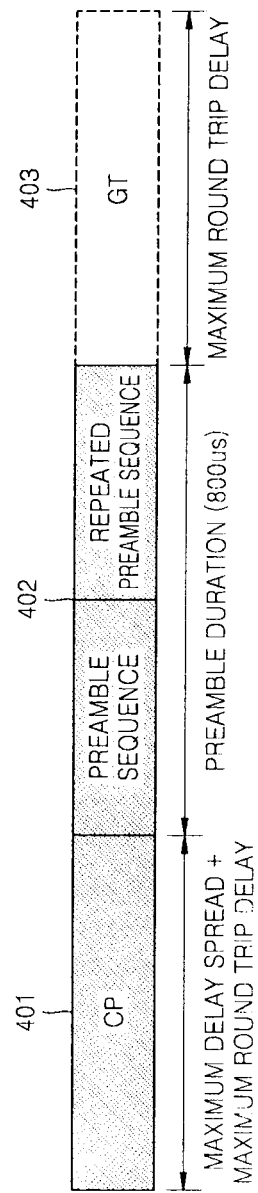
FIG. 4 is a diagram illustrating a repetitive random access preamble structure for an extended cell radius according to an embodiment of the present invention.

FIG. 4 is a diagram illustrating a repetitive random access preamble structure for an extended cell radius according to an embodiment of the present invention. The repetitive random access preamble structure of FIG. 4 is formed of a CP 401, which is the sum of the maximum delay spread that is fixed irrelevantly to a cell radius and the maximum round trip delay that extends according to the extended cell radius, and a preamble sequence part 402, which is equal to a preamble sequence part used in a repetitive preamble structure for a normal cell radius.

In the case of a cell environment, where a cell radius and path loss are both big, a base station may not receive enough preamble energy only with the length of a preamble sequence part (800 us) used in the standard preamble structure for a normal cell radius. In this case, a preamble sequence part (n×800 us), wherein the preamble sequence part (800 us) used in the 1 ms standard preamble structure is multiplied by n, is used. The value of n differs according to a cell environment, and as a normal cell radius increases, the value of n increases. The optimum value of n is determined according to the given cell environment.

The value of n is received through a broadcast channel (BCH), which is used to transmit system information of a cell.

Figure 5:
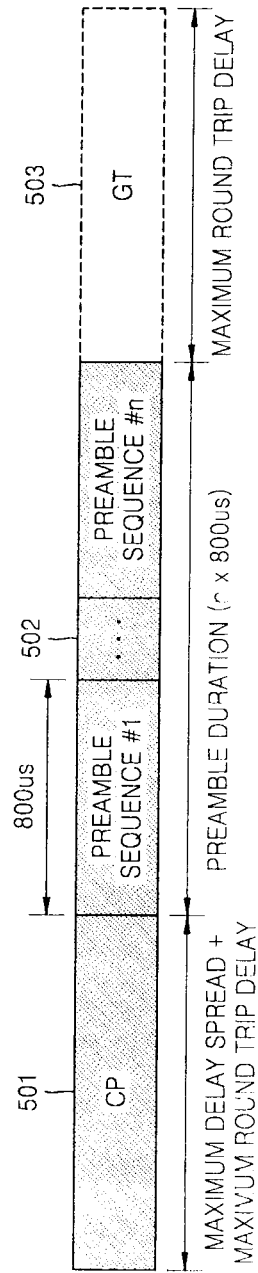
FIG. 5 is a diagram illustrating an example of a random access preamble structure for an extended cell radius according to an embodiment of the present invention.

FIG. 5 is a diagram illustrating an example of a random access preamble structure for an extended cell radius according to an embodiment of the present invention. The random access preamble structure of FIG. 5 is formed of a CP 501, which is the sum of the maximum delay spread and the maximum round trip delay, and a preamble sequence part 502, wherein a preamble sequence part of 800 us for a normal cell radius is multiplied by n. A GT 503 is the maximum round trip delay.

In this case, the number of samples for $T_{PRE}$ corresponding to the length of a preamble sequence part under the above extended cell environment will now be described.

In the above, when the radius of an extended cell is 29.6 km, the length of CP is $T_{CP}=6224\times Ts$, and at this time, the sampling time Ts is 32.55 ns (1/30.72 MHz). When n=2, i.e. when the preamble sequence part is twice a preamble sequence part in a normal cell environment, $T_{PRE}=2\times 800$ us. Accordingly, $T_{PRE}/Ts=2\times 800$ us/32.55 ns=$2\times 24576$, and as a result, $T_{PRE}=2\times 24576\times Ts$. Similarly, when n=3, $T_{PRE}=3\times 24576\times Ts$.

Figure 6:
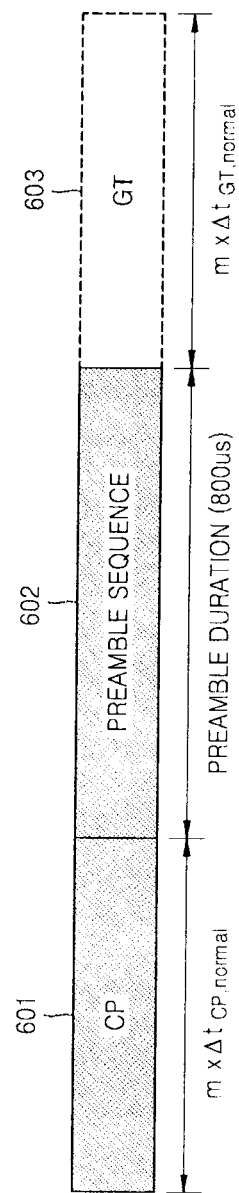
FIG. 6 is a diagram illustrating an example of a random access preamble structure for an extended cell radius according to another embodiment of the present invention.

FIG. 6 is a diagram illustrating an example of a random access preamble structure for an extended cell radius according to another embodiment of the present invention. In FIG. 6, a preamble sequence part 602 is maintained equal to the preamble sequence part (800 us) used in the standard preamble structure for a normal cell radius. However, both a CP 601 and a GT 603 are respectively CP ($\Delta t_{CP,normal}$) and GT ($\Delta t_{GT,normal}$), which are used in the standard preamble structure for a normal cell radius, multiplied by m according to the maximum round trip delay according to the extended cell radius. As a result, the CP 601 becomes $m\times \Delta t_{CP,normal}$, and the GT 603 becomes $m\times \Delta t_{GT,normal}$.

The value of m is also received through the BCH. Since a cell radius may vary, the value of m can be suitably adjusted so as to be applied to a certain cell radius.

Figure 7:
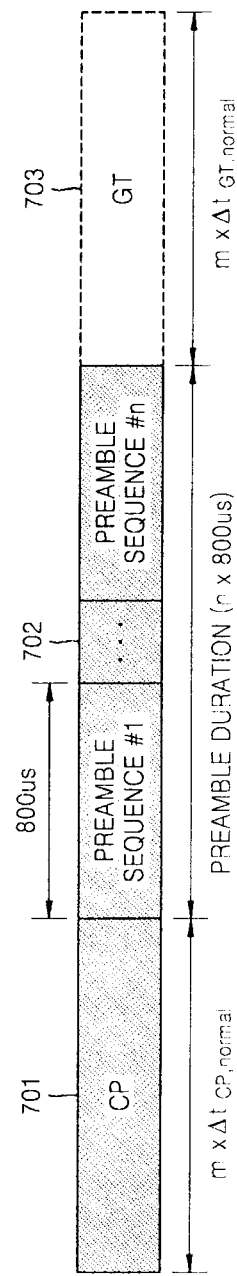
FIG. 7 is a diagram illustrating an example of a random access preamble structure for an extended cell radius according to another embodiment of the present invention.

FIG. 7 is a diagram illustrating an example of a random access preamble structure for an extended cell radius according to another embodiment of the present invention. In the random access preamble structure of FIG. 7, the preamble sequence part 502 used in FIG. 5 and the CP 601 and the GT 603 used in FIG. 6 are combined.

In the case of a cell environment, where a base station cannot receive enough preamble energy when only the preamble duration (800 us) is used in the standard preamble structure for a normal cell radius, a preamble sequence part 703 ($n\times 800$ us), wherein the preamble sequence part (800 us) used in the standard preamble structure is multiplied by n, is used. Also, a CP 701 and a GT 703 are respectively CP ($\Delta t_{CP,normal}$) and GT ($\Delta t_{GT,normal}$), which are used in the 1 ms standard preamble structure for a normal cell radius, multiplied by m according to the maximum round trip delay according to the extended cell radius. Accordingly, the CP 701 becomes $m\times \Delta t_{CP,normal}$, and the GT 703 becomes $m\times \Delta t_{GT,normal}$.

Figure 8:
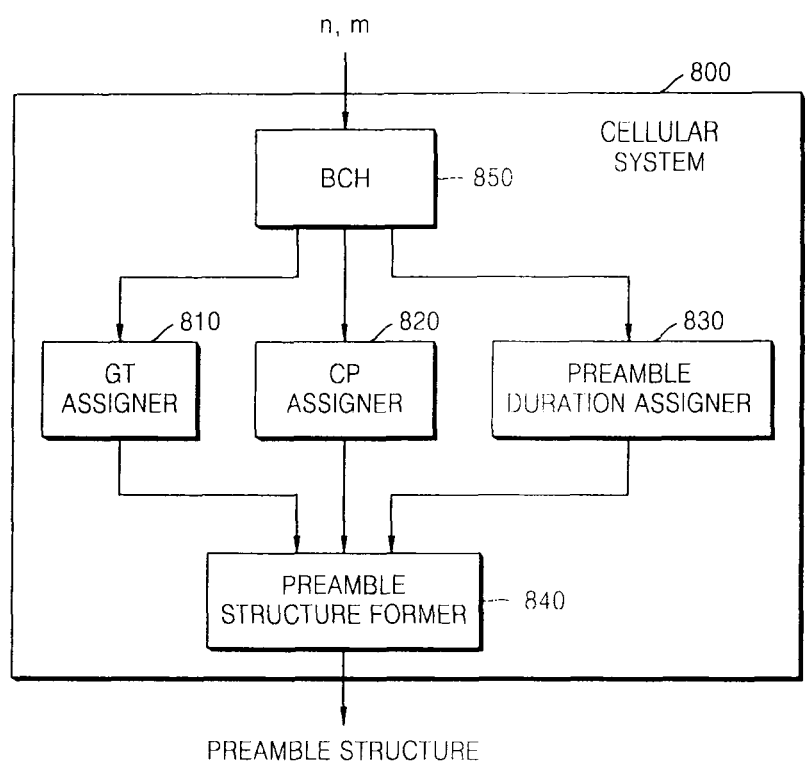
FIG. 8 is a block diagram illustrating an apparatus for forming a random access preamble structure for an extended cell radius according to an embodiment of the present invention.

FIG. 8 is a diagram illustrating an apparatus 800 for forming a random access preamble structure for an extended cell radius according to an embodiment of the present invention.

A CP generator 810 generates CP whose length is the addition of the maximum delay spread and the maximum round trip delay. A preamble sequence part generator 820 generates a preamble sequence part.

A random access preamble generator 830 generates a random access preamble in an extended cell environment by adding the CP generated by the CP generator 810 and the preamble sequence part generated by the preamble sequence part generator 830.

According to another embodiment of the present invention, the preamble sequence part generator 820 may generate a preamble sequence part that has the same length as a preamble sequence part used in a normal cell environment.

According to another embodiment of the present invention, when preamble energy is insufficient with the length of a preamble sequence part used in a standard random access preamble in a normal cell environment, the preamble sequence generator 820 may generate n-times repeated preamble sequence part (n*preamble sequence length in the normal cell environment), wherein the preamble sequence part used in the standard random access preamble is multiplied by n until the preamble energy is not insufficient.

Alternatively, the two embodiments described above may be combined. In other words, when preamble energy is insufficient with the length of a preamble sequence part used in a standard random access preamble in a normal cell environment, the preamble sequence generator 820 may generate n-times repeated preamble sequence part (n*preamble sequence length in the normal cell environment), wherein the preamble sequence part used in the standard random access preamble is multiplied by n until the preamble energy is not insufficient. Simultaneously, the CP generator 820 may generate m×CP, wherein CP, i.e. the addition of the maximum delay spread and the maximum round trip delay in the extended cell environment, is multiplied by m.

An apparatus employing the random access preamble structure for an extended cell radius may be a cellular phone.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

According to the random access preamble structure of the present invention, the preamble duration is maintained equal to the preamble duration used in the 1 ms standard preamble structure for a normal cell radius and the CP and the GT are both extended so as to be suitable for the maximum round trip delay according to an extended cell radius. Accordingly, a reception terminal can easily realize a frequency domain.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of forming a random access preamble in a cellular system, the method comprising:
receiving preamble generation information from a base station;
determining a cyclic prefix among a plurality of cyclic prefixes having different lengths based on the preamble generation information, wherein a length of the cyclic prefix is given as a product of a second predetermined length and a second integer, and the second integer is determined by the preamble generation information, wherein the cyclic prefix has a length that ranges from about 202 μs to about 684 μs;

determining a preamble sequence part among a plurality of preamble sequence parts having different lengths based on the preamble generation information, wherein a length of the preamble sequence part is given as a product of a first predetermined length and a first integer, wherein the first integer is determined by the preamble generation information, and wherein the preamble sequence part has a length that is selected from among 24576×Ts, 2×24576×Ts, and 3×24576×Ts, and Ts is a sampling time; and generating a random access preamble by combining the determined cyclic prefix and the determined preamble sequence part.

2. The method of claim 1, wherein the length of the cyclic prefix is determined by a sum of a maximum delay spread and a maximum round trip delay.

3. A method of forming a random access preamble in a cellular system, the method comprising:

receiving preamble generation information from a base station;

generating a cyclic prefix based on the preamble generation information, wherein a length of the cyclic prefix is given as a product of a second predetermined length and a second integer, and the second integer is determined by the preamble generation information, wherein the cyclic prefix has a length that ranges from about 202 μs to about 684 μs;

generating a preamble sequence part having a length that is given as a product of a first predetermined length and a first integer, wherein the first integer is determined by the preamble generation information, and wherein the preamble sequence part has a length that is selected from among 24576×Ts, 2×24576×Ts, and 3×24576×Ts, and Ts is a sampling time; and generating a random access preamble by combining the determined cyclic prefix and the determined preamble sequence part.

4. The method of claim 3, wherein the preamble generation information determines a cyclic prefix among a plurality of cyclic prefixes having different lengths and a preamble sequence part among a plurality of preamble sequence parts having different lengths.

5. The method of claim 3, wherein the length of the cyclic prefix is determined by a sum of a maximum delay spread and a maximum round trip delay.

6. An apparatus for generating a random access preamble, the apparatus comprising:

a cyclic prefix generator configured to determine a cyclic prefix among a plurality of cyclic prefixes having different lengths based on preamble generation information, wherein a length of the cyclic prefix is given as a product of a second predetermined length and a second integer, and the second integer is determined by the preamble generation information, wherein the cyclic prefix has a length that ranges from about 202 μs to about 684 μs;

a preamble sequence part generator configured to determine a preamble sequence part among a plurality of preamble sequence parts having different lengths based on the preamble generation information, wherein a length of the preamble sequence part is given as a product of a first predetermined length and a first integer, wherein the first integer is determined by the preamble generation information, and wherein the preamble sequence part has a length that is selected from among 24576×Ts, 2×24576×Ts, and 3×24576×Ts, and Ts is a sampling time; and a random access preamble generator configured to generate a random access preamble by combining the determined cyclic prefix and the determined preamble sequence part, wherein the preamble generation information is provided by a base station.

7. The apparatus of claim 6, wherein the length of the cyclic prefix is determined by a sum of a maximum delay spread and a maximum round trip delay.

8. An apparatus for generating a random access preamble, the apparatus comprising:

a cyclic prefix generator configured to generate a cyclic prefix based on preamble generation information, wherein a length of the cyclic prefix is given as a product of a second predetermined length and a second integer, and the second integer is determined by the preamble generation information, wherein the cyclic prefix has a length that ranges from about 202 μs to about 684 μs;

a preamble sequence part generator configured to generate a preamble sequence part having a length that is given as a product of a first predetermined length and a first integer, wherein the first integer is determined by the preamble generation information, and wherein the preamble sequence part has a length that is selected from among 24576×Ts, 2×24576×Ts, and 3×24576×Ts, and Ts is a sampling time; and a random access preamble generator configured to generate a random access preamble by combining the determined cyclic prefix and the determined preamble sequence part, wherein the preamble generation information is provided by a base station.

9. The apparatus of claim 8, wherein the preamble generation information determines a cyclic prefix among a plurality of cyclic prefixes having different lengths and a preamble sequence part among a plurality of preamble sequence parts having different lengths.

10. The apparatus of claim 8, wherein the length of the cyclic prefix is determined by a sum of a maximum delay spread and a maximum round trip delay.

* * * * *